United States Patent
Kaiser (10) Patent No.: US 10,275,044 B2
(45) Date of Patent: Apr. 30, 2019

(54) APPLIANCE WITH USER PRESENCE DETECTION

(71) Applicant: Haier US Appliance Solutions, Inc., Wilmington, DE (US)

(72) Inventor: Timothy David Kaiser, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 132 days.

(21) Appl. No.: 15/413,668

(22) Filed: Jan. 24, 2017

(65) Prior Publication Data

US 2018/0210412 A1    Jul. 26, 2018

(51) Int. Cl.
*G06F 3/033* (2013.01)
*G06F 3/03* (2006.01)
*G05B 19/042* (2006.01)

(52) U.S. Cl.
CPC ......... *G06F 3/0325* (2013.01); *G05B 19/042* (2013.01); *G05B 2219/2613* (2013.01); *G05B 2219/40544* (2013.01)

(58) Field of Classification Search
CPC .................................................. G06F 3/0325
See application file for complete search history.

(56) References Cited

U.S. PATENT DOCUMENTS

| 8,957,380 | B2 | 2/2015 | Costell et al. |
| 2011/0121181 | A1 | 5/2011 | Costell et al. |
| 2011/0227718 | A1* | 9/2011 | Waller .................. G06F 3/0481 340/461 |
| 2017/0020360 | A1* | 1/2017 | Alexander .......... A47L 15/4257 |
| 2017/0370636 | A1* | 12/2017 | Koo ...................... F25D 29/005 |

FOREIGN PATENT DOCUMENTS

WO    WO 2014/160908    * 10/2014

* cited by examiner

*Primary Examiner* — Yara B Green
(74) *Attorney, Agent, or Firm* — Dority & Manning, P.A.

(57) ABSTRACT

An appliance includes a user presence detector having an emitter and a sensor. The emitter is configured to emit waves having a wavelength, and the sensor is configured to sense waves of the wavelength, such as emitted waves which have been reflected back to the sensor from an object external to the appliance. There is no internal path within the appliance between the sensor and the emitter for either direct or reflected waves. The appliance also includes a user interface panel and a user input device. The user interface panel and the user input device are offset along at least one direction. The sensor is positioned on one of the user interface panel or the user input device and the emitter is positioned on the other of the user interface panel or the user input device.

20 Claims, 5 Drawing Sheets

APPLIANCE WITH USER PRESENCE DETECTION

FIELD OF THE INVENTION

The present subject matter relates generally to household appliances, and more particularly to household appliances which can detect one or more objects, e.g., a user, within close proximity to the appliances.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a microwave, and/or a coffee maker, along with room air conditioners and other various appliances. Generally, a user must manually activate such appliances in order to utilize the basic functions of the appliances.

Some household appliances can also include features for automating some or all of the basic functions of the appliance. For example, a detector might be provided to detect the presence of a user and activate the appliance in response. Such detectors generally include an emitter and a sensor. The emitter may be configured for generating waves, while the sensor may be configured for sensing such waves when the waves are reflected back towards the detector by one or more objects in proximity to the detector. It is typically desired to make such detectors as small as possible, which usually entails positioning the emitter and the sensor in close proximity to one another within a housing. However, this may permit a prohibitive amount of signals, e.g., reflected waves, to be transmitted through the housing from the emitter to the sensor, without the emitted wave first being reflected off a target outside the housing and/or appliance. This is also referred to as crosstalk. Crosstalk may inhibit the detectors' ability to detect one or more objects within a proximity of the sensor assembly. In some detectors, a physical barrier is included to attempt to reduce crosstalk, which increases the expense and complexity of the detector. Further, in some detectors, the power level of the emitter may be reduced in attempt to reduce crosstalk, which may also inhibit the efficiency and sensitivity of the detector.

Accordingly, there exists a need for an appliance with a detector for detecting a user's presence where crosstalk is reduced or eliminated without adding physical barriers or optical coatings which are costly and have limited effectiveness.

BRIEF DESCRIPTION OF THE INVENTION

In accordance with one embodiment of the present disclosure, an appliance is provided. The appliance includes a cabinet defining a vertical direction, a lateral direction and a transverse direction that are mutually perpendicular. The appliance also includes a user interface panel positioned on an exterior of the cabinet and a user input device positioned on the exterior of the cabinet proximate to the user interface panel. The appliance also includes an emitter positioned within the user interface panel. The emitter is operable to emit a wave away from the cabinet of the appliance into an external environment around the appliance, the wave having a wavelength. A sensor is positioned on the user input device. The sensor is operable to sense waves including waves having the wavelength of the waves emitted by the emitter. There is no internal path within the cabinet between the sensor and the emitter for either direct or reflected waves.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
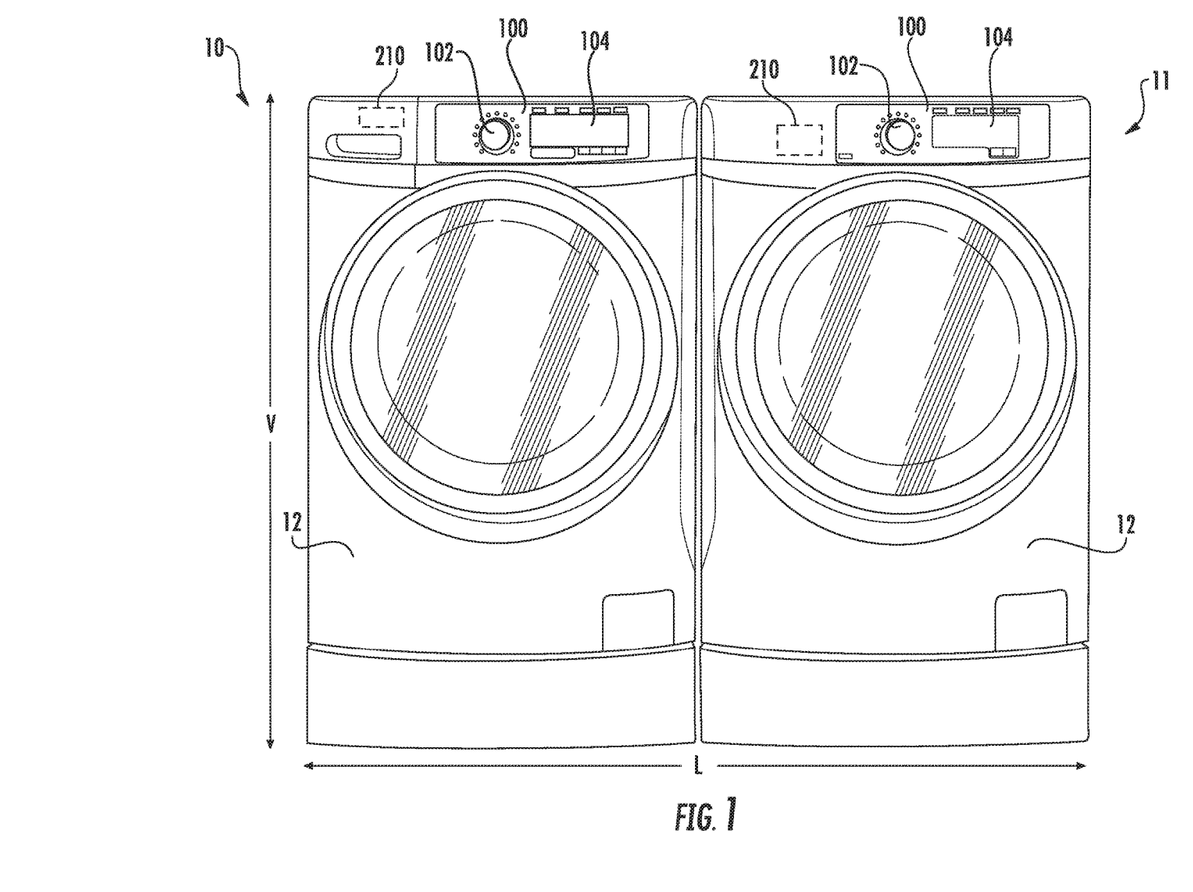
FIG. 1 provides a front view of exemplary appliances in accordance with one embodiment of the present disclosure.
Figure 2:
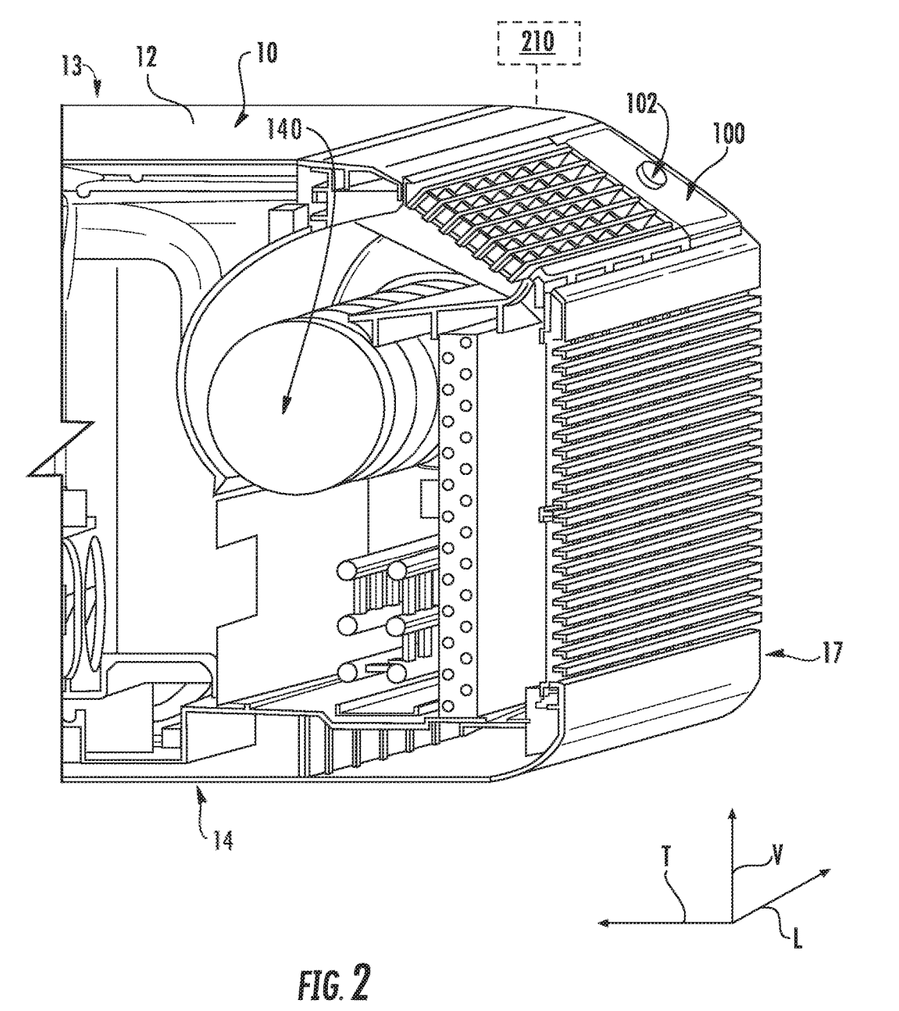
FIG. 2 provides a partial perspective view of an exemplary appliance in accordance with another embodiment of the present disclosure.
Figure 5:
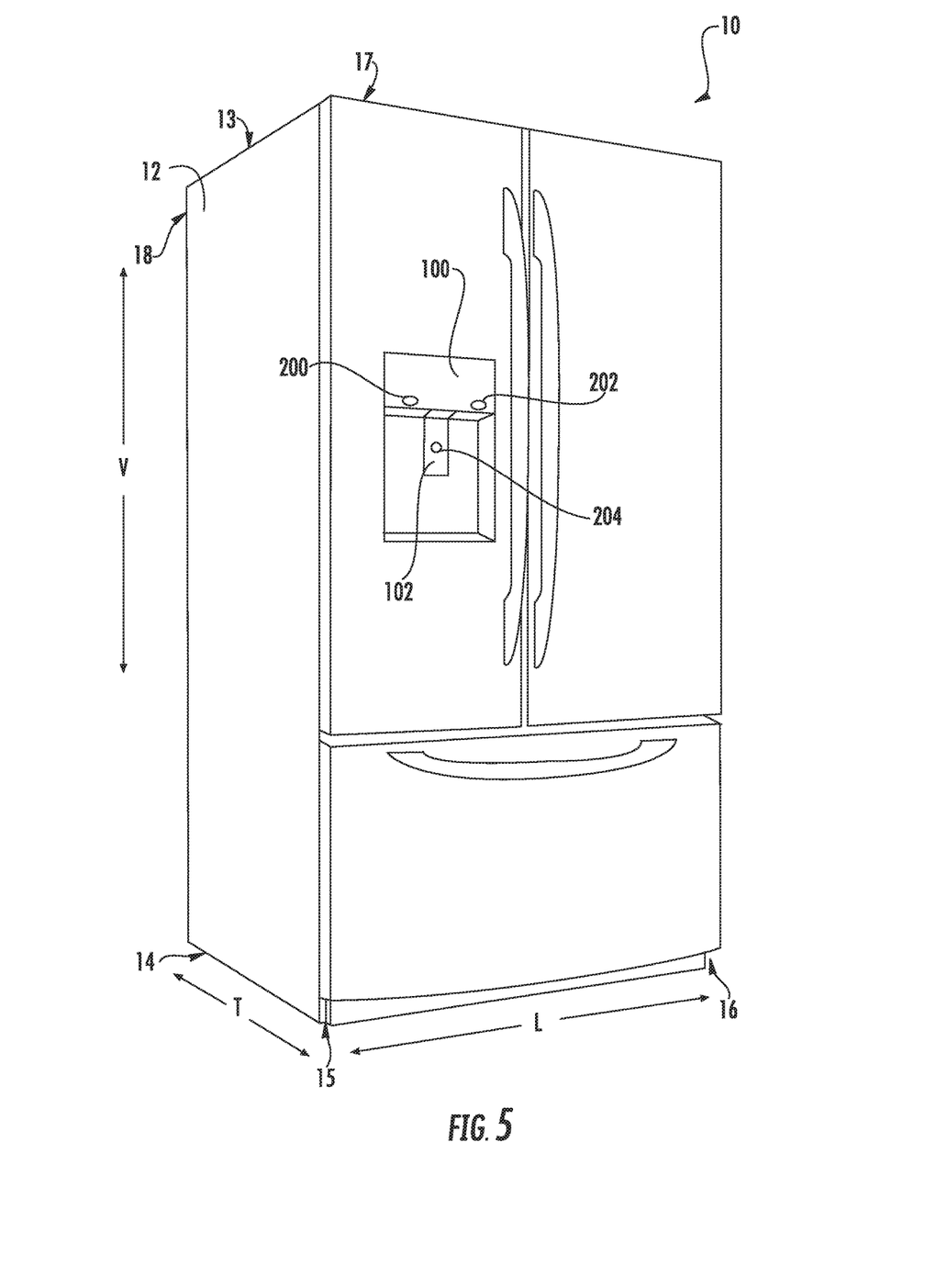
FIG. 5 provides a perspective view of an exemplary appliance in accordance with still another embodiment of the present disclosure.

As may be seen in FIGS. 1, 2, and 5, in accordance with one or more embodiments of the present subject matter, an appliance 10 having a cabinet 12 is provided. The cabinet 12 defines a vertical direction V, a lateral direction L and a transverse direction T that are mutually perpendicular. The cabinet 12 extends between a top portion 13 and a bottom portion 14 along the vertical direction V. Cabinet 12 also extends between a first side portion 15 and a second side portion 16, e.g., along the lateral direction L, and a front portion 17 and a back portion 18, e.g., along the transverse direction T.

Figure 3:
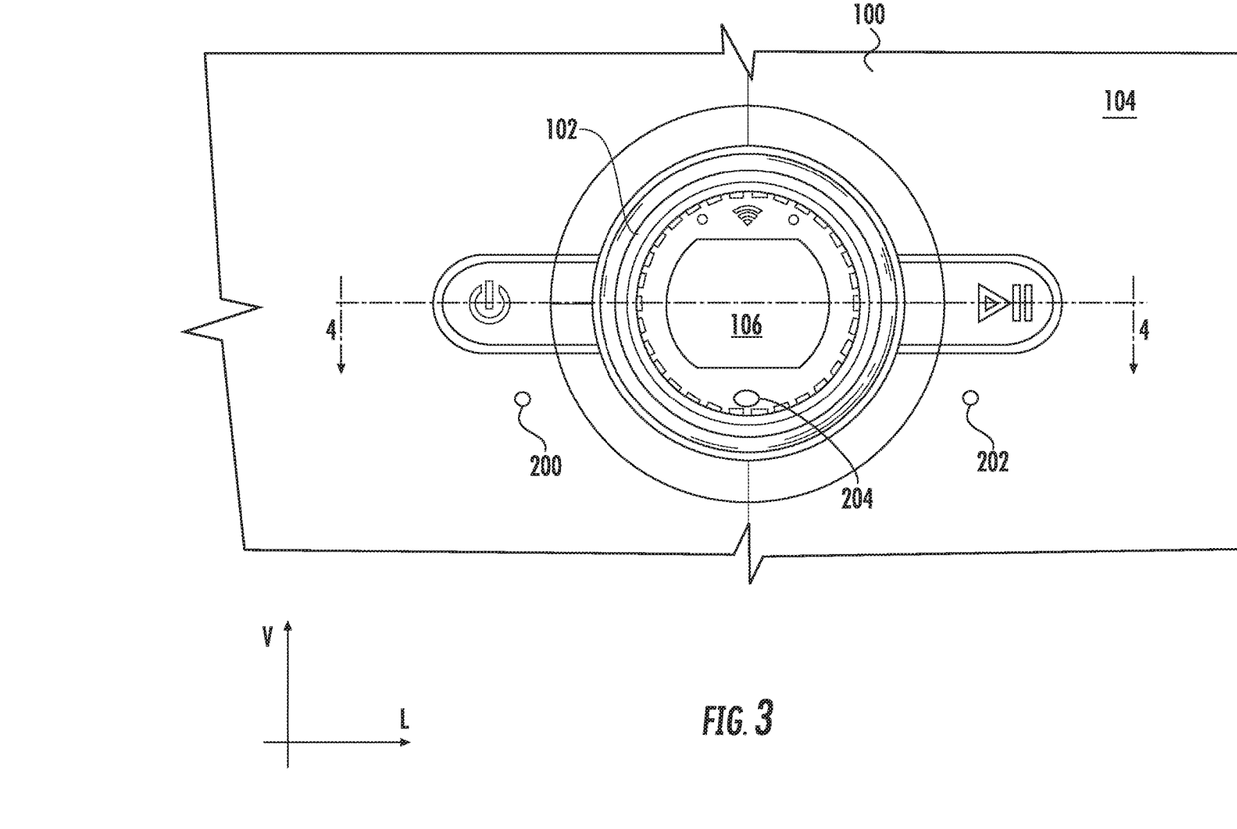
FIG. 3 provides a front view of an exemplary user interface panel which may be provided on various appliances in accordance with one or more embodiments of the present disclosure.
Figure 4:
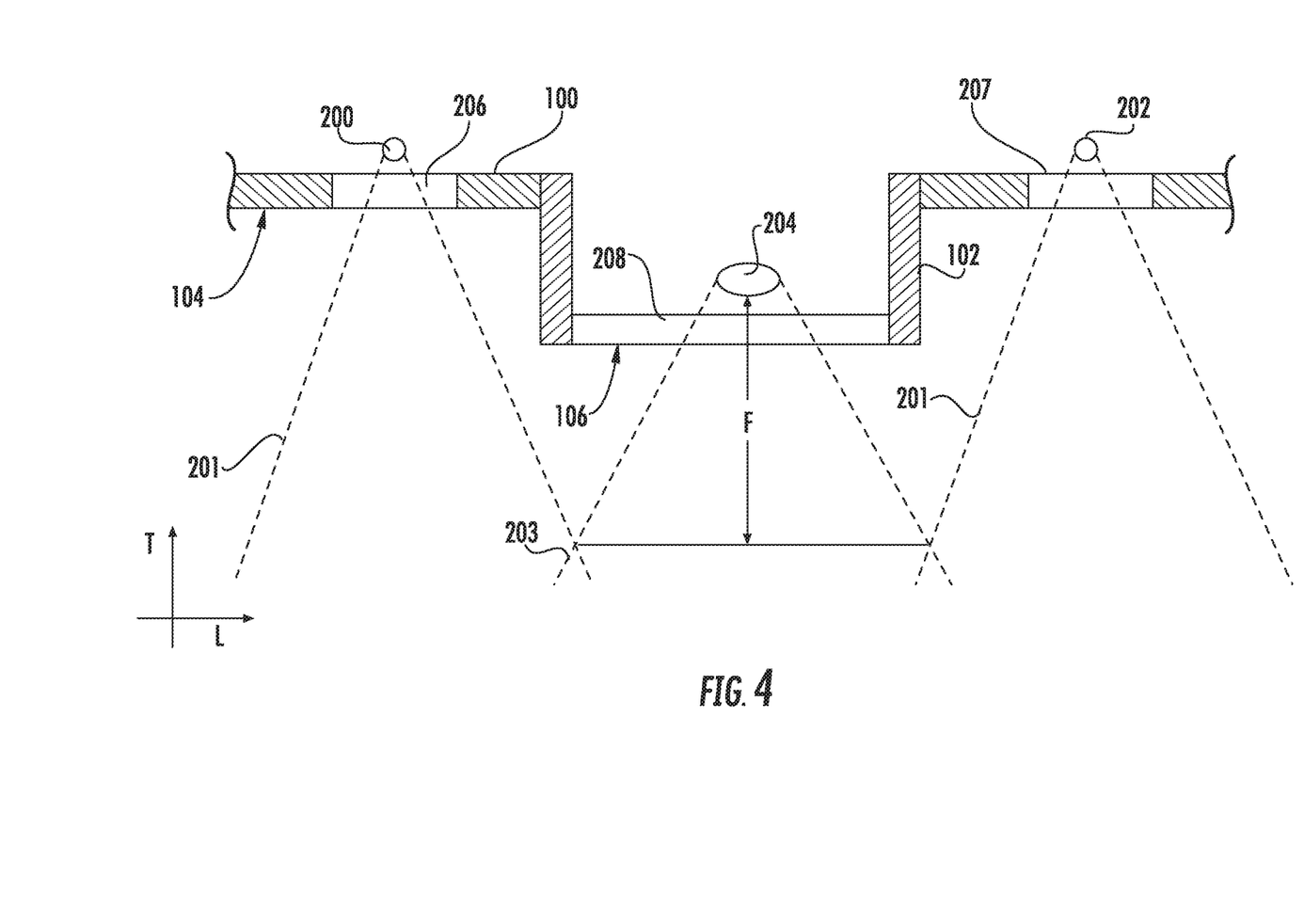
FIG. 4 provides a section view of the exemplary user interface panel of FIG. 3, taken along line 4-4 in FIG. 3.

A user interface panel 100 and a user input device 102 may be positioned on an exterior of the cabinet 12. The user input device 102 is generally positioned proximate to the user interface panel 100, and in some embodiments, the user input device 102 may be positioned on the user interface panel 100. The appliance 10 may also include features for detecting the presence of a user. For example, as shown in FIGS. 3 and 4, appliance 10 may include one or more emitters 200 and a sensor 204. The emitter 200, or emitters 200 and 202, may be configured to emit a wave having a wavelength away from the cabinet 12 of the appliance 10 into an external environment around the appliance 10. The sensor 204 may be configured to sense waves including waves having the wavelength of the emitted waves, e.g., after the emitted waves are reflected from an object located in the external environment around the appliance 10. In various embodiments, the emitter may be configured to emit ultrasonic waves, radio waves, or light waves. In some embodiments, the emitter may be a light emitting diode (LED) configured to emit infrared (IR) light having a wavelength of between about eight hundred nanometers (800 nm) and about one thousand nanometers (1000 nm), such as between about eight hundred fifty nanometers (850 nm) and about nine hundred fifty nanometers (950 nm), such as about eight hundred eighty nanometers (880 nm). In such embodiments, the sensor 204 may be a photo diode sensor configured to sense the IR light. It should be appreciated that as used herein, terms of approximation, such as "about" or "approximately," refer to being within ten percent above or below a stated value. For example, about eight hundred eighty nanometers (880 nm) may include wavelengths between and including seven hundred ninety two nanometers (792 nm) and nine hundred sixty eight nanometers (968 nm). The emitter 200 and the sensor 204 may be positioned and arranged on or within the cabinet 12 such that there is no internal path within the cabinet 12 between the sensor 204 and the emitter 200 for either direct or reflected waves. Thus, waves, e.g., IR waves, from emitter 200 may not travel through cabinet 12 to sensor 204.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user.

Generally, the appliance 10 may include a controller 210 in operative communication with the user input device 102. The appliance 10 may further include one or more emitter(s) 200 and a sensor 204. If present, the emitter(s) 200 and sensor 204 may be in operative communication with a respective controller 210 of the respective appliance 10. The sensor 204 may be configured to send a signal to the controller 210 when the sensor 204 detects reflected waves having the wavelength of the waves emitted by the emitter 200, and the controller 210 may in turn be configured to receive the signal from the sensor 204. The signal may be indicative of the presence of a user, e.g., the reflected waves sensed by the sensor 204 may be reflected from the user when the user approaches the appliance 10. The controller 210 may be further configured to activate the appliance 10 in response to the received signal. In some embodiments, controller 210 may be configured to activate the appliance by turning on a display 104 on the user interface panel 100. In some embodiments, the display 104 may be configured to enter a low-power sleep mode, e.g., wherein the display 104 is dimmed or turned off. For example, in some embodiments, the display 104 may be configured to not emit light when in sleep mode. In particular, some embodiments may also include a darkly colored cabinet 12, such that the display 104 in sleep mode provides a seamless appearance of the dark cabinet 12 and the display 104. In embodiments including a low-power sleep mode, the controller 210 may be configured to activate the appliance 10 by waking the display 104 from sleep mode. In some embodiments, the appliance 10 may include a light, and the controller may be configured to activate the appliance 10 by turning on the light.

The user interface panel 100 of the appliance 10 may be in communication with the controller 210 via, for example, one or more signal lines or shared communication busses. Input/output ("I/O") signals may be routed between controller 210 and various operational components of the appliance 10. Operation of the appliance 10 can be regulated by the controller 210 that is operatively coupled to the user interface panel 100. A user interface panel 100 may for example provide selections for user manipulation of the operation of an appliance, e.g., via user input device 102. In response to user manipulation of the user interface panel 100 and/or user input device 102, the controller 210 may operate various components of the appliance 10. Controller 210 may include a memory and one or more microprocessors, CPUs or the like, such as general or special purpose microprocessors operable to execute programming instructions or microcontrol code associated with operation of the appliance 10. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

In some embodiments, for example, as illustrated in FIG. 1, the appliance 10 may be one of a set of two or more appliances. In the exemplary embodiment illustrated in FIG. 1, appliance 10 may be one of a pair of laundry appliances, e.g., the appliance may be a washer 10 and/or dryer 11. One or both of the washer 10 and the dryer 11 may include an emitter 200 and a sensor 204 (FIG. 3). In the embodiments illustrated in FIG. 1, the user input device 102 of each appliance 10 and 11 is positioned on the user interface panel 100. The embodiment illustrated in FIG. 1 also includes a display 104 on the user interface panel. Thus, in such embodiments, controller 210 may be configured to activate the appliance 10 by turning on or waking the display 104.

FIG. 2 illustrates another example embodiment of the appliance 10, wherein the appliance 10 is a room air conditioner. As illustrated, the exemplary air conditioner 10 includes cabinet 12, user interface panel 100 and user input device 102. In the illustrated example of FIG. 2, the user input device 102 is a control knob, similar to those illustrated in FIGS. 1 and 3. The air conditioner 10 may also include a controller 210, and the controller 210 may be configured to activate the air conditioner 10, e.g., by turning on fan 140 to circulate air in response to the signal from the sensor 204 which indicates the presence of a user.

FIGS. 3 and 4 illustrate an exemplary user interface panel 100 and an exemplary user input device 102. The exemplary user interface panel 100 and user input device 102 may be provided on any suitable household appliance 10, including but not limited to the washer or dryer of FIG. 1 or the air conditioner of FIG. 2. User interface panel 100 includes a front surface 104 and user input device 102 includes outer surface 106. The outer surface 106 of the user input device 102 is offset from the front surface 104 of the user interface panel 100. In some exemplary embodiments, outer surface 106 may be offset from front surface 104 along the transverse direction T. For example, as illustrated in FIG. 4, the outer surface 106 may be forward of the front surface 104, e.g., closer to a user facing the appliance 10. In some exemplary embodiments, outer surface 106 may be generally parallel to the front surface 104, for example, along the vertical direction V and along the lateral direction L, as illustrated in FIGS. 3 and 4.

Still with reference to FIGS. 3 and 4, the emitter 200 may be positioned on one of the user interface panel 100 or the user input device 102, and the sensor 204 may be positioned on the other of the user interface panel 100 or the user input device 102. In particular, the emitter 200 and sensor 204 may be each be positioned at a respective one of the front surface 104 or outer surface 106. In some exemplary embodiments, as illustrated in FIGS. 3 and 4, the emitter 200 may be positioned within the user interface panel 100, and the sensor 204 may be positioned on the user input device 102. In particular, the emitter 200 may be positioned at the front surface 104 of the user interface panel 100 and the sensor 204 may be positioned at the outer surface 106 of the user input device 102. Accordingly, where the outer surface 106 of the user input device 102 is offset from the front surface 104 of the user interface panel 100, the emitter 200 and the sensor 204 may also be offset, e.g., along the transverse direction T.

In various exemplary embodiments, the emitter 200 and the sensor 204 may be aligned along the vertical direction V and may be spaced apart along the lateral direction L, e.g., as illustrated in FIG. 3. Such arrangement is generally considered advantageous in an appliance 10 which the user is most likely to approach from the side, e.g., along the lateral direction L, as opposed to from above or below, e.g., along the vertical direction V. In other embodiments, the emitter 200 and the sensor 204 may be spaced apart along the vertical direction V and aligned along the lateral direction L, which may be advantageous in some appliances, e.g., in a stacked washer 10 and dryer 11, such as in the dryer unit of the stacked washer dryer.

FIG. 4 provides a schematic view of a section through the user interface panel 100 along line 4-4 of FIG. 3. As may be seen in the example illustrated by FIG. 4, the emitter 200 emits waves along or within a radiation pattern 201. The emitter 200 may be configured to emit waves in a radiation pattern 201 having a variety of shapes. In the example illustrated by FIG. 4, the radiation pattern 201 of emitter 200 is generally conical and expands away from the front surface 104 of the user interface panel 100. Also as illustrated for example in FIG. 4, the sensor 204 may have a field of detection 203, which may also be referred to as a field of view, e.g., when the sensor is a light sensor. The emitter 200 and the sensor 204 may be spaced apart, e.g., along the lateral direction L, at a distance such that the radiation pattern 201 of the emitter 200 overlaps with the field of detection 203 of the sensor 204. Such overlap may advantageously provide increased sensitivity of the appliance 10 in detecting a user's presence. Accordingly, in such embodiments, a focal distance F may be defined by the distance from the sensor 204 to the overlap of the radiation pattern 201 and the field of detection 203. In various embodiments, the focal distance F may be between about two feet (2') and about seven feet (7'), such as between about three feet (3') and about six feet six inches (6.5'), such as about five feet (5'). As noted above, it should be appreciated that as used herein, terms of approximation, such as "about" or "approximately," refer to being within ten percent above or below a stated value. For example, about six feet (6') may include from sixty five inches (65" or 5'-5") to seventy nine inches (79' or 6'-7").

As may be seen, e.g., in FIG. 4, the appliance 10 may further include an emitter lens 206 in communication with the emitter 200 and a sensor lens 208 in communication with the sensor 204. In some embodiments wherein a first emitter 200 and a second emitter 202 are provided, a corresponding first emitter lens 206 and second emitter lens 207 may also be provided. Notably, the lenses 206, 207, and 208 need not include an anti-reflective coating, and in some exemplary embodiments, the anti-reflective coating may be omitted, which may advantageously reduce the cost and complexity of the lenses 206, 207, and 208. However, it will be understood that the lenses 206, 207, and 208 may include anti-reflective coatings in certain exemplary embodiments.

In some embodiments, such as the exemplary embodiment illustrated in FIGS. 3 and 4, a first emitter 200 and a second emitter 202 may be provided. In such embodiments where multiple emitters 200, 202 are provided, the emitters 200, 202 will generally all be positioned at the same surface, e.g., where the first emitter 200 is positioned at front surface 104, the second emitter 202 will generally also be positioned at the same surface, e.g., front surface 104, and at a second location. For example, the first emitter 200 may be positioned proximate to a first side of the user input device 102, and the second emitter 202 may be positioned proximate to a second side of the user input device 102. In some embodiments, such as the example embodiment illustrated in FIGS. 3 and 4, the first side of the user input device 102 may be opposite of the second side of the user input device 102 about the user input device 102, e.g., along the lateral direction L. Providing a first emitter 200 and a second emitter 202 may advantageously permit the appliance 10 to detect a user's presence within a wider range and/or over a wider area.

Still with reference to FIGS. 3 and 4, in embodiments where two emitters 200, 202 are provided, the emitters 200, 202 may be aligned along two directions and spaced apart along a third direction, with reference to a three-dimensional coordinate system having three mutually perpendicular directions. For example, as illustrated in FIGS. 3 and 4, the first emitter 200 and the second emitter 202 may be spaced apart along the lateral direction L while aligned along the vertical direction V (FIG. 3) and aligned along the transverse direction T (FIG. 4).

In another embodiment, the appliance 10 may be a refrigerator appliance, such as is illustrated in FIG. 5. FIG. 5 provides a perspective view of a refrigerator appliance 10 according to an exemplary embodiment of the present subject matter. Refrigerator appliance 10 includes a cabinet 12. The example refrigerator appliance 10 depicted in FIG. 5 is generally referred to as a bottom mount refrigerator appliance. However, it should be understood that refrigerator appliance 10 is provided by way of example only. Thus, the present subject matter is not limited to refrigerator appliance 10 and may be utilized in any suitable appliance, including without limitation, side-by-side style refrigerator appliances or top mount refrigerator appliances as well.

In some embodiments, the user input device 102 may be separate from the user interface panel 100, e.g., as illustrated in FIG. 5. Such embodiments are not limited to refrigerator appliance 10; rather, any suitable appliance 10 may have the user input device 102 separate from the user interface panel 100 rather than on the user interface panel.

Refrigerator appliance 100 may also include a dispensing assembly for dispensing, e.g., liquid water and/or ice to, for example, a dispenser recess defined on the exterior of cabinet 12, as is generally understood in the art. Thus, in some embodiments, the appliance 10 may be a refrigerator appliance and the user interface panel 100 may be or include a control panel of the dispensing assembly. Further with reference to the exemplary embodiment illustrated in FIG. 5, a first emitter 200 and a second emitter 202 may be provided on the user interface panel 100, which in this example is the control panel of the dispensing assembly. Also, in some exemplary embodiments including refrigerator appliance 10 and a dispensing assembly, the user input device 102 may be a paddle of the dispensing assembly, and the sensor 204 may be positioned on the paddle 102, paddle 102 being an exemplary embodiment of the user input device. Such dispensing assemblies, including actuators therefor such as paddles, levers, etc., are generally understood in the art and are not described further herein.

As may be seen, e.g., in FIG. 5, the first emitter 200 and the second emitter 202 may be aligned in one direction, e.g., along the vertical direction V, while spaced apart from the sensor 204 along that direction, e.g., the vertical direction V. Thus, in some embodiments, the sensor 204 may be spaced apart from the emitter(s) 200, 202 in all three directions, vertical V, lateral L, and transverse T. The configuration and arrangement of emitters 200, 202 and sensor 204 on the refrigerator appliance 10 of FIG. 5 may also be provided on other appliances as well, where user input device 102 may be separate from the user interface panel 100 and user input device 102 may have any suitable form for the embodiment of appliance 10 with which it is provided. For example, the room air conditioner of FIG. 2 may have emitter(s) 200, 202 and sensor 204 arranged similarly to the emitters 200, 202 and sensor 204 of FIG. 5.

According to various embodiments of the present disclosure, the appliance 10 may take the form of any of the examples described above, or may be any other household appliance where the ability to detect and respond to a user presence is desired. Thus, it will be understood that the present subject matter is not limited to any particular appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
a cabinet defining a vertical direction, a lateral direction and a transverse direction that are mutually perpendicular;
a user interface panel positioned on an exterior of the cabinet, the user interface panel comprising a front surface;
a user input device positioned on the exterior of the cabinet proximate to the user interface panel, the user input device comprising an outer surface offset from the front surface of the user interface panel;
an emitter positioned at the front surface of the user interface panel, the emitter operable to emit a wave away from the cabinet of the appliance into an external environment around the appliance, the wave having a wavelength; and
a sensor positioned at the outer surface of the user input device, the sensor operable to sense waves including waves having the wavelength of the waves emitted by the emitter;
wherein there is no internal path within the cabinet between the sensor and the emitter for either direct or reflected waves.

2. The appliance of claim 1, wherein the emitter and the sensor are aligned along the vertical direction and are spaced apart along the lateral direction.

3. The appliance of claim 2, wherein the emitter and the sensor are spaced apart along the transverse direction.

4. The appliance of claim 1, wherein the emitter emits the wave along a radiation pattern, and the sensor is operable to sense waves within a field of detection, wherein the radiation pattern of the emitter overlaps the field of detection of the sensor, a focal distance of the sensor is defined by the distance from the sensor to the overlap of the radiation pattern and the field of detection, and the focal distance is between about two feet and about seven feet.

5. The appliance of claim 1, wherein the outer surface of the user input device is generally parallel to the front surface of the user interface panel.

6. The appliance of claim 1, wherein the emitter is a first emitter, the appliance further comprising a second emitter positioned on the front surface of the user interface panel, the first emitter positioned proximate to a first side of the user input device, the second emitter positioned proximate to a second side of the user input device.

7. The appliance of claim 6, wherein the first side of the user input device is opposite of the second side of the user input device about the user input device.

8. The appliance of claim 1, wherein the outer surface of the user input device and the front surface of the user interface panel are parallel along the vertical direction and the lateral direction, and the outer surface of the user input device is offset from the front surface of the user interface panel along the transverse direction.

9. The appliance of claim 1, wherein the emitter is a first emitter, the appliance further comprising a second emitter, and the first emitter, the sensor, and the second emitter are aligned along the vertical direction and are spaced apart along the lateral direction.

10. The appliance of claim 9, wherein the sensor is offset from the first emitter and the second emitter along the transverse direction.

11. The appliance of claim 9, wherein the first emitter and the second emitter are aligned along the transverse direction.

12. The appliance of claim 1, further comprising a first lens in communication with the emitter and a second lens in communication with the sensor, the first lens does not include an anti-reflective coating, and the second lens does not include an anti-reflective coating.

13. The appliance of claim 1, wherein the user input device is an analog device.

14. The appliance of claim 13, wherein the user input device is a control knob.

15. The appliance of claim 1, wherein the emitter is an infrared emitter and the sensor is a photo diode sensor.

16. The appliance of claim 1, further comprising a controller in operative communication with the sensor, the controller operable to receive a signal from the sensor, the sensor operable to send a signal to the controller when the sensor detects reflected waves having the wavelength of the waves emitted by the emitter, the signal indicative of the presence of a user, and the controller further operable to activate the appliance in response to the received signal.

17. The appliance of claim 16, wherein the appliance is an air conditioner comprising a fan, and the controller is operable to activate the air conditioner by turning on the fan.

18. The appliance of claim 16, wherein the appliance comprises a light, and the controller is operable to activate the appliance by turning on the light.

19. The appliance of claim 16, wherein the user interface panel comprises a display, and the controller is operable to activate the appliance by turning on the display.

20. The appliance of claim 16, wherein the user interface panel comprises a display, and the controller is operable to activate the appliance by waking the display from sleep mode.

\* \* \* \* \*